United States Patent [19]

Kawamata et al.

[11] Patent Number: 4,952,444
[45] Date of Patent: Aug. 28, 1990

[54] MAGNETIC RECORDING MEDIUM

[75] Inventors: Toshio Kawamata; Kazuhiko Morita, both of Kanagawa, Japan

[73] Assignee: Fuji Photo Film Co., Ltd., Kanagawa, Japan

[21] Appl. No.: 170,595

[22] Filed: Mar. 18, 1988

Related U.S. Application Data

[63] Continuation-in-part of Ser. No. 26,412, Mar. 16, 1987, abandoned.

[30] Foreign Application Priority Data

Mar. 14, 1986 [JP] Japan .................................. 61-54993
Mar. 14, 1986 [JP] Japan .................................. 61-54994
Mar. 31, 1986 [JP] Japan .................................. 61-71300

[51] Int. Cl.$^5$ ............................................. G11B 23/00
[52] U.S. Cl. ................................. 428/141; 427/131; 428/336; 428/694; 428/695; 428/900
[58] Field of Search ............... 428/694, 695, 900, 141, 428/336; 427/131

[56] References Cited

U.S. PATENT DOCUMENTS

| | | | |
|---|---|---|---|
| 4,187,341 | 2/1980 | Suzuki et al. ........................ | 427/128 |
| 4,363,850 | 12/1982 | Yasui et al. ......................... | 428/694 |
| 4,367,261 | 1/1983 | Miyoshi et al. ..................... | 428/900 |
| 4,587,157 | 5/1986 | Brock et al. ........................ | 428/694 |
| 4,619,856 | 10/1986 | Kamada et al. ...................... | 428/694 |
| 4,664,965 | 5/1987 | Okita et al. ........................ | 427/131 |
| 4,666,769 | 5/1987 | Miyata et al. ....................... | 428/695 |
| 4,772,522 | 9/1988 | Kubota et al. ...................... | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium comprising a non-magnetic support having provided thereon, in order:

(a) a non-magnetic layer including at least one cellulose derivative, at least one polyurethane and at least one polyisocyanate where the concentration of the polyisocyanate is within a range of from 15 wt % to 45 wt %, and (b) a magnetic layer containing ferromagnetic particles, wherein the non-magnetic layer contains a lubricating agent and has a thickness of 1.0 $\mu$m or more, a surface roughness (Ra) of 0.02 $\mu$m or less, and a Young's modulus of $5 \times 10^4$ to $50 \times 10^4$ kg/cm$^2$ at a temperature of from 5° C. to 60° C.

6 Claims, No Drawings

MAGNETIC RECORDING MEDIUM

This is a Continuation-in-part of application Ser. No. 07/026,412 filed Mar. 16, 1987 now abandoned.

FIELD OF THE INVENTION

The present invention relates to a magnetic recording medium and more particularly it relates to a magnetic recording medium having a thinner magnetic layer than a conventional magnetic recording medium for the purpose of higher density recording wherein particularly surface properties, electromagnetic characteristics and running durability are improved.

The magnetic recording medium of the present invention is very suitable as a magnetic tape, a magnetic disk or a magnetic sheet.

BACKGROUND OF THE INVENTION

For a magnetic recording medium particularly a magnetic recording medium such as a magnetic tape, a magnetic disk or a magnetic sheet which is required to have particularly tough durability for higher density recording, it is necessary to simultaneously improve surface smoothness and running durability, thereby improving electromagnetic characteristics.

However, the conventionally used magnetic recording medium has not been able to fully respond to the above requirements for higher density recording. In fact, it is very important for a magnetic disk and the like with higher density recording that the surface of a magnetic layer be smoothed and the ferromagnetic particles be homogeneously dispersed in the magnetic layer. However, such means of making magnetic particles finer, reinforcing the smoothing treatment such as calendaring treatment and improving the dispersibility of a magnetic coating composition, which have been done so far, are not enough to give the magnetic layer sufficient durability. In actuality, a magnetic layer is made thinner and thinner with higher density recording of a magnetic recording medium.

In the past, as a means to improve running durability of a magnetic layer, various lubricating agents have been added to the magnetic layer. However, when a magnetic layer is made thinner and thinner, sufficient running durability cannot be obtained. Even with the addition of a lubricating agent into the magnetic layer the surface of the magnetic layer is easily damaged by the magnetic head while the magnetic recording medium is running in a magnetic recording apparatus and even slight unevenness on the surface of a support such as a polyester film affects the surface of the magnetic layer, thereby deteriorating electromagnetic properties.

In this connection, the inventors of the present invention made thorough studies to solve the above problems of the conventional art occurring with reduction of the thickness of a magnetic layer of a reduction of the thickness of a magnetic layer of a magnetic recording medium, and as a result thereof, the inventors have found unexpected facts and have attained the present invention.

SUMMARY OF THE INVENTION

An object of the present invention is to provide a magnetic recording medium having a magnetic layer with a greatly reduced thickness wherein electromagnetic properties, surface properties and running durability are simultaneously improved.

This and other objects of the present invention have been reached by providing a magnetic recording medium comprising a non-magnetic support having provided thereon, in order:

(a) a non-magnetic layer including at least one cellulose derivative, at least one polyurethane and at least one polyisocyanate where the concentration of the polyisocyanate is within a range of from 15 wt % to 45 wt %, and (b) a magnetic layer containing ferromagnetic particles, wherein the non-magnetic layer contains a lubricating agent and has a thickness of 1.0 $\mu$m or more, a surface roughness (Ra) of 0.02 $\mu$m or less, and a Young's modulus of $5 \times 10^4$ to $50 \times 10^4$ kg/cm$^2$ at a temperature of from 5° C. to 60° C.

DETAILED DESCRIPTION OF THE INVENTION

The present invention relates to a magnetic recording medium comprising a non-magnetic support having coated thereon a non-magnetic layer as defined hereinafter and a magnetic layer containing ferromagnetic particles in this order. The non-magnetic layer is a non-magnetic layer having a surface roughness Ra of 0.02 $\mu$m or less and a thickness of 1.0 $\mu$m or more. The non-magnetic layer is a non-magnetic layer containing a lubricating agent, having a Young's modulus of $5 \times 10^4$ to $50 \times 10^4$ kg/cm$^2$ at a temperature of from 5° C. to 60° C. and a thickness of 1.0 $\mu$m or more. The non-magnetic layer is a nonmagnetic layer containing a lubricating agent and having a thickness of 1.0 $\mu$m or more. The magnetic layer contains a lubricating agent in addition to the ferromagnetic particles, and the concentration of the lubricating agent contained in the non-magnetic layer is preferably higher than that of the lubricating agent contained in the magnetic layer.

The present invention will now be illustrated in more detail.

The magnetic recording medium of the present invention is essentially composed of a non-magnetic support having coated thereon a non-magnetic layer and further thereon a magnetic layer.

The non-magnetic supports used in the present invention are plastic films of polyethylene terephthalate, cellulose triacetate, polyethylene naphthalate, polyamide, or polyimide or the like having high tensile strength. The shapes thereof are a tape, a sheet, or a disk or the like.

The non-magnetic layer provided on the above described non-magnetic support is a layer essentially composed of a binder, having a surface roughness Ra of 0.02 $\mu$m or less and a thickness of 1.0 $\mu$m or more; a layer essentially composed of a binder, a lubricating agent, and a hardening agent, having a Young's modulus of $5 \times 10^4$ to $50 \times 10^4$ kg/cm$^2$ at a temperature of from 5° C. to 60° C. and having a thickness of 1.0 $\mu$m or more.

Ra referred to herein is a "center line average roughness" as defined by Japanese Industrial Standard B0601 and is a value measured by a needle contact surface roughness meter at a cut off value of 0.25 mm. When the magnetic layer provided on the non-magnetic layer is made thinner and thinner, the surface roughness of the first embodiment of the non-magnetic layer of the present invention turns out to be that of the magnetic layer. Therefore, when the surface roughness Ra of the non-magnetic layer is more than 0.02 $\mu$m, outputs and durability are deteriorated.

In order to make the surface roughness Ra of the non-magnetic layer 0.02 μm or less, the viscosity of the coating solution for forming the non-magnetic layer and the thickness of the layer to be provided are adjusted, by increasing or decreasing an amount of a solvent of the coating solution, to have a leveling effect of decreasing the unevenness of the surface, or a calendering treatment for smoothing the surface in which the non-magnetic layer is passed between two metal rollers adjustable in temperature thereof, or between a metal roller and a plastic roller a distance between which is changed thereby to change the pressure to be applied to the non-magnetic layer, after coating and drying the non-magnetic layer.

When the Young's modulus is less than $5 \times 10^4$ kg/cm² at a temperature of 5° C. to 60° C., both disk durability and tap durability deteriorate. When the Young's modulus is more than $50 \times 10^4$ kg/cm², at a temperature of 5° C. to 60° C., particularly disk durability deteriorates. Values of the Young's modulus as defined above can be obtained by using binders in combination as hereinafter described. The Young's modulus of a non-magnetic layer can be obtained by the following formula.

$$E = (E_1 T_1 + E_2 T_2) / (T_1 + T_2)$$

In the formula, $T_1$ is the thickness of the support, $T_2$ is the thickness of the non-magnetic layer, $E_1$ is the Young's modulus of the support, and $E_2$ is the Young's modulus of the support provided with a non-magnetic layer. Each of the Young's modulus as described above is obtained from the stress at tensile test with 2% distortion.

The thickness of all embodiments of the nonmagnetic layer is 1.0 μm or more, preferably from 1.0 to 10 μm. Such a thickness is necessary to relieve the impact caused by contact of a magnetic head on the magnetic layer having a reduced thickness.

The binders used for forming the above described non-magnetic layer(s) include nitrocellulose, a polyvinyl chloride resin, a vinyl chloride and vinyl acetate copolymer resin and the like. The binders can be used together with other binders in order to further improve the smoothness of the non-magnetic layer.

Specific examples of combinations of binders include; a vinyl chloride and vinyl acetate copolymer resin-an epoxy resin-a polyamide resin; a vinyl chloride and vinyl acetate copolymer resin - polyurethane - polyisocyanate; cellulose derivatives - polyurethane - polyisocyanate; and the like.

Polyurethane as used herein is a polyester polyurethane resin and a polyether polyurethane resin which are prepared by reacting organic dibasic acids such as saturated or unsaturated carboxylic acids of maleic acid or adipic acid alicyclic dicarboxylic acid or aromatic dicarboxylic acid of phthalic acid with polyols such as glycols (e.g. ethylene glycol, propylene glycol, diethylene glycol or polyethylene glycol); polyhydric alcohols (e.g., trimethlol propane hexanetriol, glycerine or pentaerythritol); polyhydric phenols (e.g., hydroguinone or bisphenol A); polyester polyols synthesized by the reaction of at least two polyols selected from the above described glycols, polyhydric alcohols or polyhydric phenols; lactone type polyester polyols synthesized from lactones of α-caprolactone and γ-butyl lactone; or polyether polyols prepared from ethylene oxide, propylene oxide or butylene oxide in the presence of a polyisocyanate as a hardening agent referred to hereinafter.

These polyurethane resins can have an isocyanate group, a hydroxyl group, a carboxylic group or a mixture thereof at the terminal. These polyurethane resins of "Crisvon 7209", "Crisvon 6119" and "Pandex T-FM1" manufactured by DAINIPPON INK AND CHEMICALS, INC. "N2304" and "N-2301" manufactured by Nippon Polyurethane Co., Ltd., and "D-2100" manufactured by Sumitomo Bayer Urethane Co., Ltd.

The cellulose derivatives used herein are nitrocellulose, cellulose acetate and butylate or cellulose propionate. Those cellulose derivatives having an average degree of polymerization of from 50 to 800, preferably from 80 to 500 are used. When cellulose derivatives having many residual hydroxyl groups are used, wear resistance of the thus formed non-magnetic layer deteriorates, which is unfavorable. On the other hand, when cellulose derivatives having few residual hydroxyl groups are used, both dispersibility and wear resistance of the non-magnetic layer gradually decreases, thereby increasing manufacturing cost. Therefore using cellulose derivatives having residual hydroxyl groups in a ratio of from 7.5 to 40% is desired.

The polyisocyanates as described above and used as a hardening agent are di-, tri- and tetraisocyanates selected from aliphatic compounds, aromatic compounds and alicyclic compounds having at least two —N=C=O groups in a molecule. Examples of suitable isocyanates include ethane diisocyante, butane diisocyanate, hexane diisocyanate, 2,2-dimethylpentane diisocyanate, 2,2,4-trimethylpentane diisocyanate, decane diisocyante,
w,w'-diisocyanate-1,3-dimethylbenzole,
w,w'-diisocyanate-1,2-dimethycyclohexane,
w,w'-diisocyanate-1,4-diethylbenzole,
w,w'-diisocyanate-1,5-dimethylnaphthalene,
w,w'-diisocyanate-n-propylbiphenyl,
1,3-phenylene diisocyanate, 1,3-phenylene diisocyanate, 1-methylbenzole-2,4-diisocyanate, 1,3-dimethylbenzole-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate 3,3'-dimethoxydiphenylmethane-4,4'-diisocyanate, 4,4'-diethoxydiphenylmethane-4,4'-diisocyanate, 1-methylbenzole-2,4,6-triisocyanate, 1,3,5-trimethylbenzole-2,4,6-triisocyanate, diphenylmethane-2,4,4'-triisocyanate, triphenylmethane-4,4', 4''-triisocyanate tolylenediisocyanate. 1,5-naphthylene diisocyanate; dimers or trimers of these iscocyanates or an adduct product of divalent or trivalent polyalcohols with these isocyanates, such as, for example, an adduct product of trimethylpropane and tolylene diisocyanate or hexamethylene diisocyanate. These hardening agents can be used in a ratio of from 10 to 60 parts by weight based on 100 parts by weight of the binder.

The polyisocyanate is used within a range of from 15 to 45 wt % based on 100 wt % of at least one cellulose derivative, the at least one polyurethane and the at least polyisocyanate.

Lubricating agents can be added to the nonmagnetic layer, if desired. The lubricating agents include fatty acids, metal soaps, fatty acid amides, higher aliphatic alcohols, aliphatic alcohols and fatty acids, mercapto group substituted fatty acids, esters of various acids such as phosphoric acid, boric acid, titanic acid or silicic acid, fluorine substituted compounds thereof, paraffins, silicon oils, animal and vegetable oils, mineral oils, higher aliphatic amines; inorganic particles such as graphite, silica, molybdenum disulfide or tungsten disulfide; resin particles such as polyethylene, polypropylene, polyvinyl chloride, copolymers of ethylene and vinyl chloride, or polytetrafluoroethylene; α-olefin polymers, unsaturated aliphatic hydrocarbons which are liquid at a normal temperature, for exasmple in the range from 10° C. to 40° C. and flurocarbons. Among those, particularly preferred lubricating agents are fatty acids, metal salts of fatty acids (metal soaps), fatty acid amides, aliphatic alcohols and fatty acids, esters of various acids such as phosphoric acid, boric acid, titanic acid or silicic acid and fluorine substituted compounds thereof.

In addition to the lubricating agents, abrasive agents usch as carbon black, alumina, chromium oxide, tungsten carbide or garnet can be added into the non-magnetic layer if desired. Furthermore, plasticizers such as tricresyl phosphate or dibutyl phthalate, dispersing agents such as lecithin, and stabilizing agents such as lead stearate, or calcium stearate can be added to the non-magnetic layer.

A magnetic layer is provided on the above described non-magnetic layer. The magnetic layer is essentially composed of ferromagnetic particles and a binder used for bonding the particles. furthermore, a lubricating agent, carbon black and other abrasive agents, a plasticizer, a dispersing agent, and a stabilizer can be added thereto, if desired. The thickness of the magnetic layer is set to 0.1 to 2μm. However, the thickness of the magnetic layer is not limited to the range.

The ferromagnetic particles are $\gamma$-$Fe_2O_3$, $Fe_3O_4$, $FeO_x$ ($1.33<x<1.5$), Fe metal particles and $CrO_2$, Co-containing $\gamma$-$Fe_2O_3$, and Co-containing $FeO_x$ ($1.33<x<1.5$). Co-containing $\gamma$-$Fe_2O_3$ and Co-containing $FeO_x$ are particularly preferred. These ferromagnetic particles have a diameter of from about 0.1 to 2.0 μm.

The binders, the lubricating agent, the abrasive agent, the plasticizer, the dispersing agent and the stabilizer, which can be added to the magnetic layer, are those that can be used in the non-magnetic layer as described above.

Each ingredient used in the non-magnetic layer and the magnetic layer can be the same or different.

Concentrations of the lubricating agent used in both the non-magnetic layer and the magnetic layer are within the range of from 1 to 80 wt %, preferably from 3 to 55 wt % relative to the binder. When the concentration is lower than the lower limit of 1 wt %, durability of the magnetic recording medium cannot effectively be obtained. When the concentration exceeds the upper limit of 80 wt %, durability also deteriorates by plasticization of the binder due to the lubricating agent.

Further when a lubricating agent is used in both the non-magnetic layer and the magnetic layer, it is characteristic regarding the proportion of the lubricating agents to be employed that when the concentration of the lubricating agent contained in the non-magnetic layer is higher than that contained in the magnetic layer, the present invention is more effective. The effects of the present invention will be illustrated more specifically by the following Examples and Comparative Examples hereinafter referred to. The difference between the concentration of the lubricating agent contained in the non-magnetic layer and the magnetic layer is from about 0.1 to 30 wt %, preferably from about 3 to 15 wt %.

The amounts of the other ingredients to be used in the non-magnetic layer and the magnetic layer can be determined by those skilled in the art and particular ingredients and additive amounts thereof can optionally be determined depending upon the purpose of usage.

Thus, a magnetic recording medium of the present invention can be prepared by preparing the non-magnetic and magnetic coating compositions using the above described ingredients, coating each composition on a support in order (first the non-magnetic layer composition and second the magnetic layer composition) and drying it to form a non-magnetic layer and a magnetic layer. Each ingredient in the coating composition for the non-magnetic layer or the magnetic layer must be dissolved or dispersed homogeneously in an organic solvent so that all parts of the layers have the same quality.

Suitable organic solvents include alcohol solvents such as methanol, ethanol, isopropyl alcohol or butanol; ester solvents such as ethyl acetate or butyl acetate; ketone solvents such as methyl ethyl ketone, methyl isobutyl ketone, acetone or cyclohexanone or a mixed solvent thereof in an appropriate proportion. The organic solvents are selected so that ingredients to be dissolved can be sufficiently dissolved, and when a mixture of solvent is used, the solvents to be mixed and the proportion to be employed can optionally be selected. These solvents should not deteriorate characteristics of ferromagnetic particles.

Upon dissolving the ingredients with solvents, a dissolvent apparatus such as a ball mill or a dissolvent bath equipped with a stirring wing can be employed.

Upon drying a coated layer after coating, conventionally used drying apparatuses can be employed.

The present invention will now be illustrated in more detail by the following Examples and Comparative Examples. The results of samples obtained from all Examples and Comparative Examples are shown collectively at the end. In the Examples an Comparative Examples, all parts are by weight.

EXAMPLE 1

On a polyethylene terephthalate film having a surface roughness Ra of 0.028 μm and a thickness of 75 μm was coated the coating composition 1 prepared according to the formulation set forth below to form a non-magnetic layer having a thickness of 1 8 μm, and further thereon was coated the coating composition 2 prepared according to the formulation set forth below to form a magnetic layer having a thickness of 0.6 μm.

1. Formulation of a coating composition for the non-magnetic layer:

| | |
|---|---|
| Nitrocellulose | 12 parts |
| Polyurethane "Crisvon 6119" manufactured by DAINIPPON INK AND CHEMICALS INC. | 6 parts |
| Electroconductive carbon black (average particle size 30 μm) | 5 parts |
| Butyl stearate | 3.0 parts |
| Oleic acid | 1.0 parts |
| Myristic acid modified silicone | 1.5 parts |
| Solvent (mixed solvent of methyl ethyl ketone/toluene/methylisobutyl ketone, mixing ratio = 2:2:1) | |

The above composition was put in a ball mill, mixed sufficiently to prepare a coating composition having a viscosity of 10 poise at 25° C. Then the following composition was added thereto and mixed sufficiently to prepare a coating composition for the non-magnetic layer.

| Polyisocyanate "Urecoat B for Myler #1 CLEAR" prepared by Higashi Nippon Paint Co., Ltd. | 7 parts |
|---|---|

2. Formulation of a coating composition for the magnetic layer:

| Co-added feOx particles (X = 1.4, average particle size = 0.3 μm × 0.03 μm) | 100 parts |
|---|---|
| Copolymer of vinyl chloride and Vinyl acetate "UMCH", manufactured by U.S. Union Carbide Co., Ltd. | 13 parts |
| Polyurethane "N-2304", manufactured by Nippon Polyurethane Co., Ltd. | 4 parts |
| Cr$_2$O$_3$ | 5 parts |
| Carbon black "Asahi #80", manufactured by Asahi Carbon Co., Ltd. | 5 parts |
| Butyl stearate | 2.0 parts |
| Oleic acid | 1.0 parts |
| Myristic acid modified silicone | 1.5 parts |
| Solvent (mixed solvent of methyl ethyl ketone/toluene/methyl isobutyl ketone, mixing ratio = 2:2:1) | |

The above composition was put in a ball mill, stirred sufficiently and dispersed homogeneously, and then 7 parts of polyisocyanate "Urecoat B for Myler #1 Clear" manufactured by Higashi Nippon Paint Co., Ltd. were added thereto and mixed sufficiently to prepare a coating composition for the magnetic layer.

The thus prepared magnetic layer was subjected to calendering treatment using a surface gloss producing apparatus and was cut to a circular flexible disk having a radius of 5.25 inches to obtain Sample No. 1.

COMPARATIVE EXAMPLE 1

On the same polyester film support as used in Example 1 was directly coated a coating composition 2 for a magnetic layer without providing a non-magnetic layer, which was then dried to form a magnetic layer having a thickness of 0.6 μm. The magnetic layer was subjected to calendaring treatment, cut to a circular flexible disk having a radius of 5.25 inches to obtain Sample No. 2.

COMPARATIVE EXAMPLE 2

The same coating composition for a magnetic layer as used in Example 1 was coated on a polyester film having surface roughness Ra of 0.009 μm and a thickness of 75 μm to obtain a magnetic layer having a thickness of 0.6 μm. The magnetic layer was subjected to calendaring treatment and cut to a circular flexible disk having a radius of 5.25 inches to obtain Sample No. 3.

COMPARATIVE EXAMPLE 3

The same procedure as in Example 1 was repeated to prepare a circular flexible disk having a radius of 5.25 inches to obtain Sample No. 4 except that the thickness of the non-magnetic layer was 0.5 μm.

EXAMPLE 2

The same coating composition for a non-magnetic layer as used in Example 1 was coated on a polyester film support having a thickness of 10 μm to form a non-magnetic layer having a thickness of 2.0 μm. Then a coating composition for a magnetic layer having the following formulation was coated thereon to form a magnetic layer having a thickness of 1.0 μm.

Formulation of a coating composition for a magnetic layer.

| Fe Metal particles (average particle diameter 0.25 μm × 0.02 μm) | 100 parts |
|---|---|
| Butyl stearate | 1.0 part |
| Copolymer of vinyl chloride and Vinyl acetate "UMCH", manufactured by Union Carbide Co., | 13 parts |
| Polyurethane "N-2304", manufactured by Nippon Polyurethane Co., Ltd. | 4 parts |
| Cr$_2$O$_3$ | 5 parts |
| Carbon black "Asahi #80", manufactured by Asahi Carbon Co., Ltd. | 5 parts |
| Oleic acid | 0.5 part |
| Myristic acid modified silicone | 1.0 part |
| Solvent (mixed solvent of methyl ethyl ketone/toluene/methyl isobutyl ketone, mixing ratio = 2:2:1) | |

Other procedures were the same as those in Example 1 and a non-magnetic layer having a thickness of 1.0 μm was formed. The magnetic layer was subjected to surface treatment using calendaring and was cut to a tape having a width of ½ inch to obtain a magnetic recording tape designated Sample No. 5

EXAMPLE 3

On the same polyester film support having a thickness of 10 μm as used in Example 2 was coated the same coating composition for a magnetic layer as used in Example 2 except that Ba ferrite ferromagnetic particles (average particle diameter 0.08 μm×0.03 μm) were used instead of the ferromagnetic particles of Example 2, and other procedures were the same as those in Example 2 to prepare a magnetic recording tape designated Sample No. 6 having a width of ½ inch.

COMPARATIVE EXAMPLES 4 and 5

On the polyester films having a thickness of 10 μm as used in Examples 2 and 3 was directly coated a coating composition for a magnetic layer as used in Examples 2 and 3 and then the same procedures as in Examples 2 and 3 were repeated respectively to prepare Samples No. 7 and No. 8.

COMPARATIVE EXAMPLE 6

The same procedure as in Example 2 was repeated to prepare Sample No. 9 except that the thickness of the non-magnetic layer was 0.4 μm.

Various characteristics of samples obtained from the Examples and Comparative Examples were checked and the results thereof are shown in Tables 1 and 2.

EXAMPLE 4

On both surfaces of a polyethylene terephthalate film support having a surface roughness Ra of 0.025 μm and a thickness of 75 μm was coated a coating composition 3 having the following formulation of form a non-magnetic layer having a thickness of 1.8 μm, and furthermore thereon was coated a coating composition 4 having the following formulation to form a magnetic layer having a thickness of 0.6 μm.

3. Formulation of a coating composition for forming a non-magnetic layer:

| | |
|---|---|
| Nitrocellulose | 12 parts |
| Polyurethane "Crisvon 6119" manufactured by DAINIPPON INK AND CHEMICALS INC. | 3 parts |
| Electroconductive carbon black (average particle diameter = 30 μm) | 3 parts |
| Butyl stearate | 0.5 part |
| Oleic acid | 0.1 part |
| Myristic acid modified silicone | 0.2 part |
| Solvent (mixed solvent of methyl ethyl ketone/toluene/methyl isobutyl ketone, mixing ratio = 2:2:1) | |

The above ingredients were put in a ball mill, mixed sufficiently to prepare a coating composition having a viscosity of 10 poise at 25° C. Then, the following composition was added thereto, and sufficiently mixed to prepare a coating composition for forming a non-magnetic layer.

| | |
|---|---|
| Polyisocyanate "Collonate L" manufactured by Nippon Polyurethane Co., Ltd. | 4 parts |

4. Formulation for a coating composition for forming a magnetic layer:

| | |
|---|---|
| Co-added FeOx particles (x = 1.4, average particle diameter = 0.3 μm × 0.03 μm) | 100 parts |
| Copolymer of vinyl chloride and vinyl acetate "UMCH", manufactured by U.S. Union Carbide Co., Ltd. | 13 parts |
| Polyurethane "N-2304" manufactured by Nippon Polyurethane Co., Ltd. | 4 parts |
| Cr$_2$O$_3$ | 5 parts |
| Carbon black "Asahi #80" prepared by Asahi Carbon Co., Ltd. | 5 parts |
| Butyl stearate | 2.0 parts |
| Oleic acid | 1.0 parts |
| Myristic acid modified silicone | 1.5 parts |
| Solvent (mixed solvent of methyl ethyl ketone/toluene/methyl isobutyl ketone, mixing ratio = 2:2:1) | |

The above ingredients were put in a ball mill, stirred sufficiently and dispersed homogeneously and then the following composition was added thereto and sufficiently mixed to prepare a coating composition for forming a magnetic layer.

| | |
|---|---|
| Polyisocyanate "Urecoat B for Myler #1 Clear", manufactured by Higashi Nippon Paint Co., Ltd. | 7 parts |

The thus prepared magnetic layer was subjected to smoothing treatment using calendering (surface gloss producing apparatus) and cut to a circular flexible disk having a radius of 5.25 inches to obtain Sample 10.

EXAMPLE 5

The same procedure as in Example 1 was repeated to prepare a flexible disk designated Sample No. 11 except that 3 parts of polyisocyanate were used in the coating composition 3 for forming a non-magnetic layer used in Example 4 and that 2 parts of polyisocyanate were used in the coating composition 4 for forming a magnetic layer used in Example 4.

COMPARATIVE EXAMPLE 7

The same procedure as in Example 1 was repeated to prepare a flexible disk designated Sample No. 12 except that 4 parts, 8 parts and 2 parts of nitrocellulose, polyurethane and polyisocyanate in the coating composition 3 for forming a non-magnetic layer used in Example 4 were used respectively.

COMPARATIVE EXAMPLE 8

The same procedure as in Example 1 was repeated to prepare a flexible disk designated Sample No. 13 except that 4 parts and 6 parts of nitrocellulose and polyurethane were used in the coating composition 3 for forming non-magnetic layer of Example 4 respectively and polyisocyanate was removed.

COMPARATIVE EXAMPLE 9

The same procedure as in Example 1 was repeated to prepare a flexible disk designated Sample No. 14 except that 10 parts, 2 parts and 12 parts of nitrocellulose, polyurethane and polyisocyanate, respectively, were used in the coating composition 3 for forming a non-magnetic layer.

COMPARATIVE EXAMPLE 10

The same procedure as in Example 1 was repeated to prepare a flexible disk designated Sample No. 15 except that 10 parts and 12 parts of nitrocellulose and polyisocyanate were used in the coating composition 3 for forming a non-magnetic layer respectively and polyurethane was removed therefrom.

Various characteristics of Samples No. 10 to 15 were checked and the results are shown in Table 3.

On both surfaces of a polyethylene terephthalate film support having a surface roughness Ra of 0.025 μm and a thickness of 75 μm was coated a coating composition 5 having the following formulation for form a non-magnetic layer having a thickness of 1.8 μm and further thereon a coating composition 6 having the following formulation to form a magnetic layer having a thickness of 0.6 μm.

5. Formulation of a coating composition for formimg a non-magnetic layer:

| | |
|---|---|
| Nitrocellulose | 12 parts |
| Polyurethane "Crisvon 6119" manufactured by DAINIPPON INK AND CHEMICALS INC. | 6 parts |
| Electroconductive carbon black (average particle diameter = 30 μm) | 5 parts |
| Butyl stearate | 3.0 parts |
| Oleic acid | 1.5 parts |
| Myristic acid modified silicone | 2.0 parts |
| Solvent (mixed solvent of methyl ethyl ketone/toluene/methyl isobutyl ketone, mixing ratio = 2:2:1) | |

The above ingredients were put in a ball mill, mixed sufficiently to prepare a coating composition having a viscosity of 10 poise at 25° C., and then the following ingredient was added thereto and mixed sufficiently to prepare a coating composition for forming a non-magnetic layer.

| | |
|---|---|
| Polyisocyanate "Collonate L" manufactured by Nippon Polyurethane Co., | 4 parts |

-continued

Ltd.

6. Formulation of a coating composition for forming a magnetic layer:

| | |
|---|---|
| Co added Feox particles (x = 1.4, average particle diameter = 3.0 μm × 0.03 μm) | 100 parts |
| Copolymer of vinyl chloride and Vinyl acetate, "UMCH" manufactured by U.S. Union Carbide Co., Ltd. | 13 parts |
| Polyurethane "N-2304", manufactured by Nippon Polyurethane Co., Ltd. | 4 parts |
| $Cr_2O_3$ | 5 parts |
| Carbon black "Asahi #80", manufactured by Asahi Carbon Co., Ltd. | 5 parts |
| Butyl stearate | 2.0 parts |
| Oleic acid | 1.0 parts |
| Myristic acid modified silicone | 1.5 parts |
| Solvent (mixed solvent of methyl ethyl ketone/toluene/methyl isobutyl ketone, mixing ratio = 2:2:1) | |

The above ingredients were put in a ball mill, mixed and stirred sufficiently and dispersed homogeneously. Then, the following ingredient was added thereto and mixed sufficiently to prepare a coating composition for forming a magnetic layer.

| | |
|---|---|
| Polyisocyanate "Urecoat B for Myler #1 Clear" manufactured by Higashi Paint Co., Ltd. | 7 parts |

The thus prepared magnetic layer was subjected to smoothing treatment using calendering (surface gloss producing apparatus) to obtain a circular flexible disk designated Sample No. 16 having a radius of 5.25 inches.

COMPARATIVE EXAMPLE 11-1

The same procedure as in Example 1 was repeated to prepare a flexible disk designated Sample No. 17 except that the butyl stearate, oleic acid and myristic acid modified silicon were removed from the coating composition 5 for forming a non-magnetic layer used in Example 6.

COMPARATIVE EXAMPLE 11-2

The same procedure as in Example 1 was repeated to prepare a flexible disk designated Sample No. 18 except that 1.5 parts, 0.5 part and 1.0 part of butyl stearate, oleic acid and myristic acid modified silicon, respectively, were used in the coating composition 5 for forming a non-magnetic layer as used in Example 6.

COMPARATIVE EXAMPLE 11-3

The same procedure as in Example 1 was repeated to prepare a flexible disk designated Sample No. 19 except that the coating composition 6 for forming a magnetic layer as used in Example 6 was directly coated on a polyethylene terephthalate film support without forming a non-magnetic layer.

COMPARATIVE 11-4

The same procedure as in Comparative Example 11-3 was repeated to prepare a flexible disk designated Sample No. 20 except that a polyethylene terephthalate film having surface roughness Ra of 0.009 μm and a thickness of 75 μm was used instead of a support film as used in Example 6.

COMPARATIVE EXAMPLE 11-5

The same procedure as in Example 1 was repeated to prepare a flexible disk designated Sample No. 21 except that the thickness of the non-magnetic layer 5 as used in Example 6 was changed to the thickness of 0.5 μm.

Each characteristic of Samples Nos. 16 through 21 was checked and the results are shown in Table 4.

EXAMPLE 7

On a polyethylene terephthalate film having a thickness of 10 μm, the coating composition 5 for the non-magnetic layer as used in Example 6 was coated to form a non-magnetic layer having a thickness of 2.0 μm. Further thereon the same coating composition 2 for forming a magnetic layer as used in Example 1, except that Fe metal particles (average particle diameter 0.25 μm × 0.02 μm) were used instead of Co added FeOx and that additives such as butyl stearate (1.0 part), oleic acid (0.5 part) and myristic acid modified silicon (1.0 part) were used, was coated to form a magnetic layer having a thickness of 1.0 μm.

The thus prepared magnetic layer was subjected to surface treatment using calendaring and was cut to a tape having a width of ½ inch to prepare Sample No. 22.

COMPARATIVE EXAMPLE 12-1

The same procedure as in Example 2 was repeated to prepare a magnetic tape Sample No. 23 except that butyl stearate, oleic acid and myristic acid modified silicon were removed from the coating composition 5 for forming a non-magnetic layer as used in Example 6.

COMPARATIVE EXAMPLE 12-2

The same procedure as in Example 2 was repeated to prepare a magnetic tape designated Sample No. 24 except that the weight ratio of butyl stearate, oleic acid and myristic acid modified silicon in the coating composition 5 for forming a non-magnetic layer as used in Example 6 was changed to 0.5 part, 0.2 part and 0.5 part respectively.

COMPARATIVE EXAMPLE 12-3

The same procedure as in Example 2 was repeated to prepare a magnetic tape designated Sample No. 25 except that the coating composition 6 for forming a magnetic layer as used in Example 6 was directly coated on a polyethylene terephthalate film having surface roughness Ra of 0.011 μm.

EXAMPLE 8, COMPARATIVE EXAMPLES 13-1 TO 13-3

The same procedure as used in Example 7, Comparative Examples 12-1, 12-2 and 12-3 was repeated respectively to prepare a magnetic tape designated Sample Nos. 26 through 29, except that ferromagnetic Fe metal particles used in these Examples and Comparative Examples were changed to ferromagnetic Ba ferrite particles (average particle diameter 0.08 μm × 0.03 μm) and that the thickness of the magnetic layer was made 0.7 μm.

Each characteristic of Samples Nos. 22 through 29 was checked and the results thereof are shown in Table 5.

EXAMPLE 9

On a polyethylene terephthalate film support having surface roughness Ra of 0.025 μm and a thickness of 75 μm was coated a coating composition 7 prepared as below to form a non-magnetic layer having a thickness of 1.8 μm and further thereon a coating composition 8 prepared as below was coated to prepare a magnetic layer having a thickness of 0.6 μm.

7. Formulation of a coating composition for forming a non-magnetic layer:

| | |
|---|---|
| Nitrocellulose | 12 parts |
| Polyurethane "Crisvon 6119" manufactured by DAINIPPON INK AND CHEMICALS INC. | 6 parts |
| Electroconductive carbon black (average particle diameter = 30 μm) | 5 parts |
| Ethyl stearate | 0.5 part |
| Oleic acid | 0.5 part |
| Oleic acid modified silicone | 0.5 part |
| Solvent (mixed solvent of methyl ethyl ketone/toluene/methyl isobutyl ketone, mixing ratio = 2:2:1) | |

The above ingredients were put in a ball mill, mixed sufficiently to prepare a coating composition having a viscosity of 10 poise at 25° C. Then, the following ingredient was added thereto, and mixed sufficiently to prepare a coating composition for a non-magnetic layer.

| | |
|---|---|
| Polyisocyanate "Collonate L", prepared by Nippon Polyurethane Co., Ltd. | 2 parts |

8. Formulation of a coating composition for forming a magnetic layer:

| | |
|---|---|
| Co added FeOx particles (x = 1.4, average particle diameter = 0.3 μm × 0.03 μm) | 100 parts |
| Copolymer of vinyl chloride and vinyl acetate "UMCH" prepared by U.S. Union Carbide Co., Ltd. | 13 parts |
| Polyurethane "N-2304", manufactured by Nippon Polyurethane Co., Ltd. | 4 parts |
| Cr₂O₄ | 5 parts |
| Carbon black "Asahi #80", manufactured by Asahi Carbon Co., Ltd. | 5 parts |
| Ethyl stearate | 2.0 parts |
| Oleic acid | 1.0 parts |
| Oleic acid modified silicone | 2.0 parts |
| Solvent (mixed solvent of methyl ethyl ketone/toluene/methyl isobutyl ketone, mixing ratio = 2:2:1) | |

The above ingredients were put in a ball mill, sufficiently stirred and dispersed homogeneously and the following ingredient was added thereto, and mixed sufficiently to prepare a coating composition for forming a magnetic layer.

| | |
|---|---|
| Polyisocyanate "Urecoat B for Myler #1 Clear" prepared by Higashi Nippon Paint Co., Ltd. | 7 parts |

The thus prepared magnetic layer was subjected to smoothing treatment using calendering, and cut to a circular flexible disk having a radius of 5.25 inches of give Sample No. 30.

COMPARATIVE EXAMPLE 14-1

The same procedure as in Example 9 was repeated to prepare a flexible disk designated Sample No. 31 except that ethyl stearate, oleic acid and oleic acid modified silicon were removed from the coating composition 7 for forming a non-magnetic layer used in Example 9.

COMPARATIVE EXAMPLE 14-2

The same procedure as in Example 9 was repeated to prepare a flexible disk of designated Sample No. 32 except that a coating composition for forming a magnetic layer of Example 9 was directly coated on a polyethylene terephthalate film support.

COMPARATIVE EXAMPLE 14-3

The same procedure as in Comparative Example 14-2 was repeated to prepare a flexible disk designated Sample No. 33 except that a polyethylene terephthalate film having a surface roughness Ra of 0.009 μm and a thickness of 75 μm was used instead of the film support of Example 9.

COMPARATIVE EXAMPLE 14-4

The same procedure as in Example 9 was repeated to prepare a flexible disk designated Sample No. 34 except that the thickness of the non-magnetic layer of Example 9 was made 0.5 μm.

The characteristics of the thus obtained sample Nos. 30 through 34 were checked and the results thereof are shown in Table 6.

EXAMPLE 10

On a polyethylene terephthalate film having a thickness of 10 μm was coated a coating composition 7 for forming a non-magnetic layer as described in Example 9 to form a non-magnetic layer having a thickness of 2.0 μm. Further thereon a coating composition 8 for forming a magnetic layer as described in Example 9, except that Fe metal particles (average particle diameter 0.25 μ×0.02 μm) were used instead of Co added FeOx and that additives such as ethyl stearate (1.0 part), oleic acid (0.5 part) and oleic acid modified silicon (1.0 part) were used, was coated to form a magnetic layer having a thickness of 1.0 μm.

The thus prepared magnetic layer was subjected to smoothing treatment using calendering, and cut to a tape having a width of ½ inch to prepare Sample No. 35.

COMPARATIVE EXAMPLE 15-1

The same procedure as in Example 10 was repeated to prepare a magnetic tape of Sample No. 36 except that ethyl stearate, oleic acid and oleic acid modified silicon were removed from the coating composition 7 for forming a non-magnetic layer of Example 9.

COMPARATIVE EXAMPLE 15-2

The same procedure as in Example 10 was repeated to prepare a magnetic tape of designated No. 37 except that a coating composition 8 for forming a magnetic layer of Example 9 was directly coated on a polyethylene terephthalate film support having a surface roughness Ra of 0.011 μm.

EXAMPLE 11

On a polyethylene terephthalate film having a thickness of 10 μm was coated a coating composition 7 for formimg a non-magnetic layer as described in Example 9 to form a non-magnetic layer having a thickness of 2.0 pm. Further thereon a coating composition 8 for forming a magnetic layer as described in Example 9 wherein Ba ferrite magnetic particles (average particle diameter 0.08 μm×0.03 μm) were used instead of Co added FeOx was coated to form a magnetic layer having a thickness of 0.7 μm. Other procedures were the same as those of Example 10 to prepare a magnetic tape designated Sample No. 38.

COMPARATIVE EXAMPLE 16-1

The same procedure as in Example 11 was repeated to prepare a magnetic tape designated Sample No. 39 except that ethyl stearate, oleic acid and oleic acid modified silicon were removed from the coating composition 7 for forming a non-magnetic layer of Example 9.

COMPARATIVE EXAMPLE 16-2

The same procedure as in Example 11 was repeated to prepare a magnetic tape designated Sample No. 40 except that a coating composition 8 for forming a magnetic layer of Example 9 was directly coated on a polyethylene terephthalate film support having surface roughness Ra of 0.011 μm.

Each characteristic of the thus prepared Sample Nos. 35 through 40 was checked and the results thereof are shown in Table 7.

TABLE 1

| Example/Comparative Example | Sample No. | Surface Roughness Ra of non-magnetic layer (μm) | (Magnetic Floppy Disk) Surface Roughness Ra of magnetic layer (μm) | Durability (× 10,000) | Tap Durability (× 10,000) | Outputs (Relative Value) | Young's Modules of non-magnetic layer (× 10⁴ kg/cm²) |
|---|---|---|---|---|---|---|---|
| Example 1 | 1 | 0.017 | 0.013 | 2250 | 20 or more | 100 | 22 |
| Comparative Example 1 | 2 | — | 0.024 | 520 | 1.5 | 80 | |
| Comparative Example 2 | 3 | — | 0.011 | 490 | 1.4 | 100 | |
| Comparative Example 3 | 4 | 0.025 | 0.022 | 920 | 3 | 83 | 22 |

TABLE 2

| Example/Comparative Example | Sample No. | Surface Roughness Ra of non-magnetic layer (μm) | (Magnetic Tape) Surface Roughness Ra of magnetic layer (μm) | Still Durability (× 10,000) | Outputs (Relative Value) | Young's Modules of non-magnetic layer (× 10⁴ kg/cm²) |
|---|---|---|---|---|---|---|
| Example 2 | 5 | 0.018 | 0.015 | 750 | 100 | 22 |
| Example 3 | 6 | 0.017 | 0.014 | 920 | 100 | 22 |
| Comparative Example 4 | 7 | — | 0.024 | 10 | 81 | |
| Comparative Example 5 | 8 | — | 0.023 | 15 | 83 | |
| Comparative Example 6 | 9 | 0.023 | 0.021 | 320 | 85 | 22 |

TABLE 3

| Example/Comparative Example | Sample No. | Young's Modules of non-magnetic layer (× 10⁴ kg/cm²) | Disk Durability (× 10,000) | Tap Durability (× 10,000) | Surface Roughness Ra of non-magnetic layer (μm) | Surface Roughness Ra of Magnetic layer (μm) |
|---|---|---|---|---|---|---|
| Example 4 | 10 | 28 | 2260 | 20 or more | 0.016 | 0.013 |
| Example 5 | 11 | 15 | 1920 | 20 or more | 0.014 | 0.012 |
| Comparative Example 7 | 12 | 4 | 550 | 8 | 0.013 | 0.011 |
| Comparative Example 8 | 13 | 2.5 | 320 | 2 | 0.011 | 0.009 |
| Comparative Example 9 | 14 | 51 | 870 | 20 | 0.019 | 0.016 |
| Comparative Example 10 | 15 | 60 | 760 | 12 | 0.024 | 0.021 |

TABLE 4

| Example/Comparative Example | Sample No. | Surface Roughness Ra of non-magnetic layer (μm) | (Magnetic Floppy Disk) Surface Roughness Ra of magnetic layer (μm) | Durability (× 10,000) | Tap Durability (× 10,000) | Outputs (Relative Value) | Young's Modules of non-magnetic layer (× 10⁴ kg/cm²) |
|---|---|---|---|---|---|---|---|
| Example 6 | 16 | 0.018 | 0.015 | 2300 | 20 or more | 180 | 22 |
| Comparative Example 11 | 17 | — | 0.018 | 2230 | 20 or more | 180 | — |

As is clear from the results shown in Tables 1 and 2, Sample Nos. 1, 5 and 6 prepared according to Examples of the present invention exhibit sufficient disk durability and tap durability. However, Sample Nos. 2, 3, 7 and 8 which were not provided with a non-magnetic layer and Sample Nos. 4 and 9 which had a surface roughness Ra of 0.02 μm or more have greatly poor disk durability and tap durability.

Furthermore, from the results as shown in Table 3, it is clear that Sample Nos. 10 and 11 prepared in according to Examples of the present invention exhibit sufficient disk durability and tap durability.

In each of Sample No. 12 and No. 13 having a Young's modulus of the non-magnetic layer of less than $5 \times 10^4$ kg/cm$^2$, and in each of Sample No. 14 and No. 15 having a Young's modulus of a non-magnetic layer of more than $50 \times 10^4$ kg/cm$^2$, both disk durability and tap durability are remarkably deteriorated.

In Examples 1, 2 and 3 and Comparative Examlples 3 and 6, the Young's modulus was measured, as shown in Tables 1 and 2.

In Examples 4 and 5 and Comparative Examples 7, 8, 9 and 10. Surface Roughnesses of the non-magnetic and magnetic layers was measured, as shown in Table 3.

Table 4 provides Data of relevance to Example 6 and Comparative Example 11, modifying Example 1 and Comparative Example 1, respectively, so that the magnetic layer had a thickness of 1.2 μm.

In accordance with the present invention, both running durability and electromagnetic properties can be remarkably improved in a magnetic recording medium having a magnetic layer with an extremely reduced thickness such as a magnetic recording tape, a magnetic disk or the like.

What is claimed is:

1. A magnetic recording medium comprising a non-magnetic support having provided thereon in order:
   (a) a non-magnetic layer including at least one cellulose derivative, at least one polyurethane and at least one polyisocyanate in which the concentration of said polyisocyanate is within a range from 15 wt % to 45 wt %, and (b) a magnetic layer containing ferromagnetic particles.
   wherein said non-magnetic layer contains a lubricating agent and has a thickness of 1.0 μm or more, a surface roughness Ra of 0.02 μm or less, and a Young's modulus of $5 \times 10^4$ to $50 \times 10^4$ kg/cm$^2$ at a temperature of from 5° C. to 60° C.

2. The magnetic recording medium of claim 1, wherein said magnetic layer has a thickness of less than 1 μm.

3. The magnetic recording medium of claim 1, wherein said cellulose derivative is nitrocellulose.

4. The magnetic recording medium of claim 1, wherein said lubricating agent is at least one fatty acid.

5. The magnetic recording medium of claim 1, wherein said lubricating agent is an ester of an aliphatic alcohol or a fatty acid.

6. The magnetic recording medium of claim 1, wherein said non-magnetic layer contains an abrasive agent.

* * * * *